July 7, 1959

P. RENAUT 2,893,239

ULTRASONIC FLAW DETECTOR DEVICE

Filed Dec. 24, 1954

INVENTOR

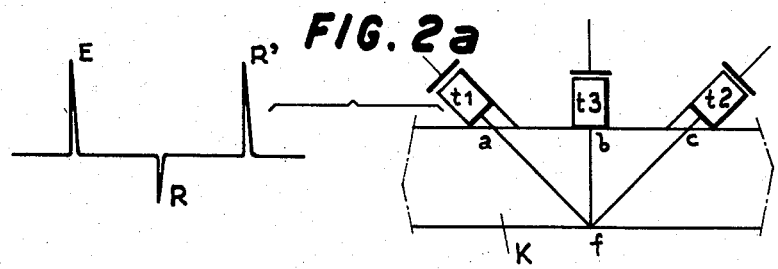
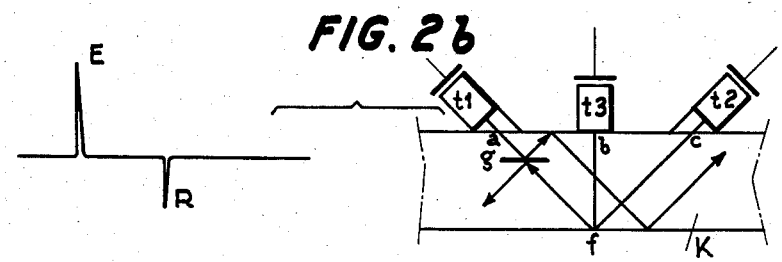
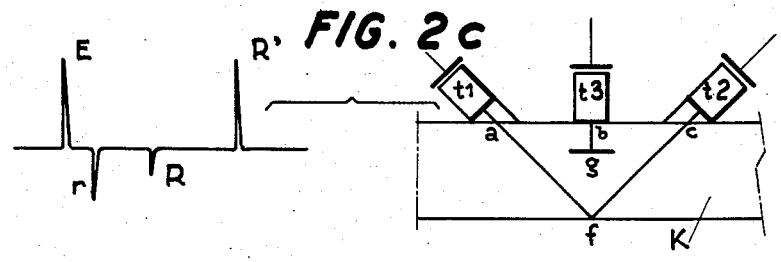
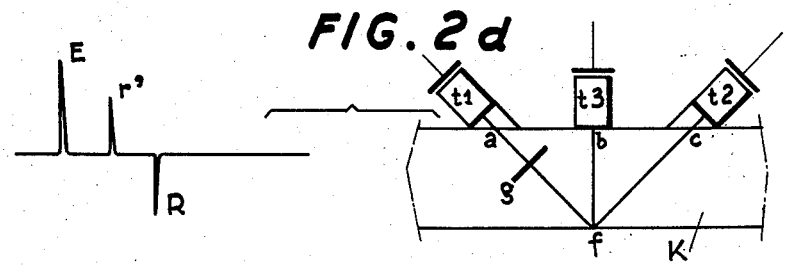
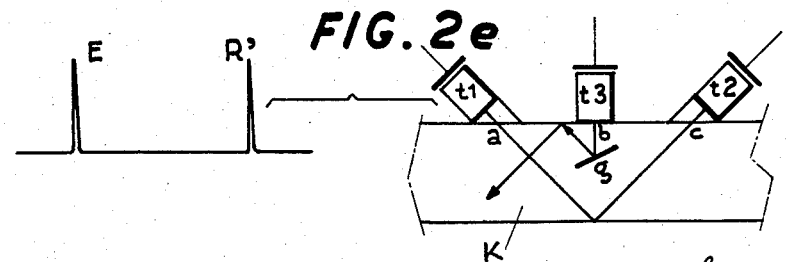

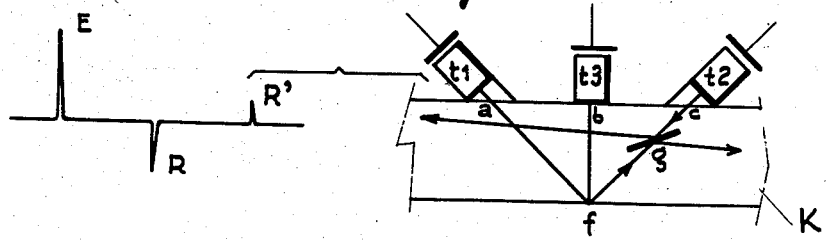
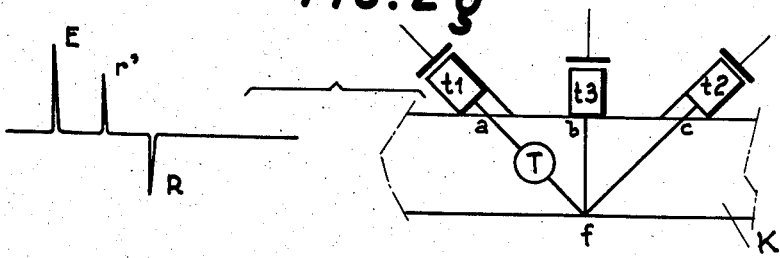
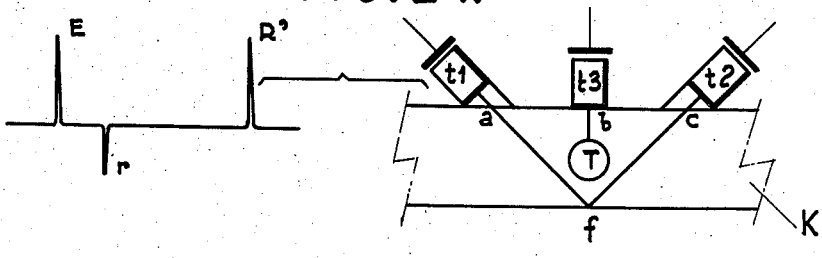
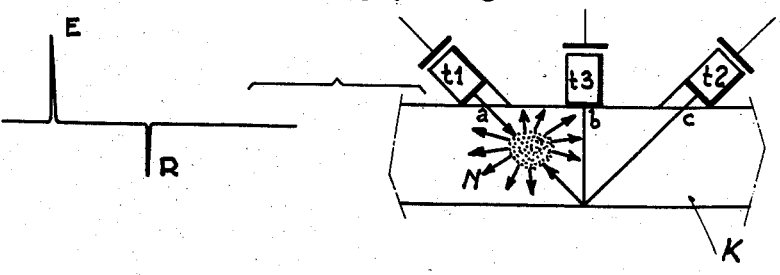

United States Patent Office 2,893,239
Patented July 7, 1959

2,893,239

ULTRASONIC FLAW DETECTOR DEVICE

Paul Renaut, Saint-Maur, France, assignor to S.a.r.l. "Realisations Ultrasoniques," Saint-Maur, France, a corporation Application December 24, 1954, Serial No. 477,447

Claims priority, application France February 4, 1954

6 Claims. (Cl. 73—67.7)

The invention relates to apparatus for inspecting metal objects, particularly rails, by means of ultrasonic vibrations. Said apparatus generally comprise: means for generating recurrent electric pulses; a piezo-electric transducer for converting said electric pulses into ultrasonic pulses applied to an external surface of the test piece or test body, the same transducer generally receiving the back reflections caused by any reflecting surface into the piece, either internal defects, or another internal surface of the piece; and means for displaying the electrical echoes corresponding to said back reflections in order to indicate the positions of the flaws.

A difficulty arises when the various types of defects encountered must be distinguished; in certain cases, a skilled operator may distinguish between the various defects, from a careful observation of the shapes of the various corresponding displayed echoes, for instance on the screen of a cathode-ray tube. But this examination is time consuming, difficult, and, in a number of cases, hardly possible to perform with the ultrasonic inspection apparatus of prior art. It is quite necessary however, in certain applications, to distinguish quickly and in a dependable manner between the various types of defects encountered in a metal piece: for instance in a rail flaw detector, and more specifically in the continuous testing of a rail.

Therefore, it is a general object of the invention to provide an ultrasonic inspection apparatus comprising means for immediately distinguishing between various reflecting surfaces in the test piece.

A more specific object of the invention is to provide an ultrasonic rail flaw detector device, comprising means for immediately distinguishing, during continuous testing of the rail, the internal angularly inclined fissures, from other types of reflecting surfaces in the rail, constituting much less serious defects.

In an ultrasonic inspection apparatus of the type comprising a pulse generator, a plurality of electro-acoustic transducers for transmitting pulses into the test piece and receiving back reflections thereof, said pulses having a carrier ultra-acoustic frequency $f$ and a low recurrent frequency $F$, and means for indicating electrical signals corresponding to said back reflections, there is provided, according to the invention, electronic means for converting said pulses into electrical signals comprising at least two of the following distinct types:

First type.—Electrical positive "pips" having a recurrent frequency $F$, and corresponding to the ultrasonic pulses, after detection thereof.

Second type.—Electrical negative "pips," having a recurrent frequency $F$, and corresponding to the ultrasonic pulses, after detection thereof.

Third type.—Electrical pulses, having a carrier frequency $f$ and a recurrent frequency $F$, and corresponding to the undetected ultrasonic pulses.

According to the invention said indicating means distinguishes between these three types of electrical signals.

According to a particular embodiment of the invention, said indicating means comprise a cathode ray tube, at least two of said three types of electrical signals being fed to the plates of vertical deflection, and being displayed on the screen under the form of at least two of the following signals: a detected positive pip, a detected negative pip, and an undetected pulse.

According to a modification, two types of electrical signals, corresponding to positive and negative detected pulses, are fed to the control electrode of said cathode ray tube, and are displayed, under the form of a brighter spot and a darker spot on the horizontal trace scan on the screen, and the last type of electrical signals, corresponding to undetected pulses, is fed to the plates of vertical deflection and is displayed on the screen under the form of an undetected "pip."

Of course the invention is not limited to the embodiments illustrated in particular. Many other methods of displaying the electrical signals at the output of the electronic receivers may be devised by those skilled in the art; for instance, instead of a cathode ray tube, the indicating means may comprise means, such as loudspeakers, for converting said electrical signals into various different audible sounds which the operator is able to distinguish from each other.

Further objects and advantages of this invention will become apparent in the following description thereof, and in the accompanying drawings, in which:

Figs. 2a to 2i are illustrative of the operation of said device; and

Figure 1:
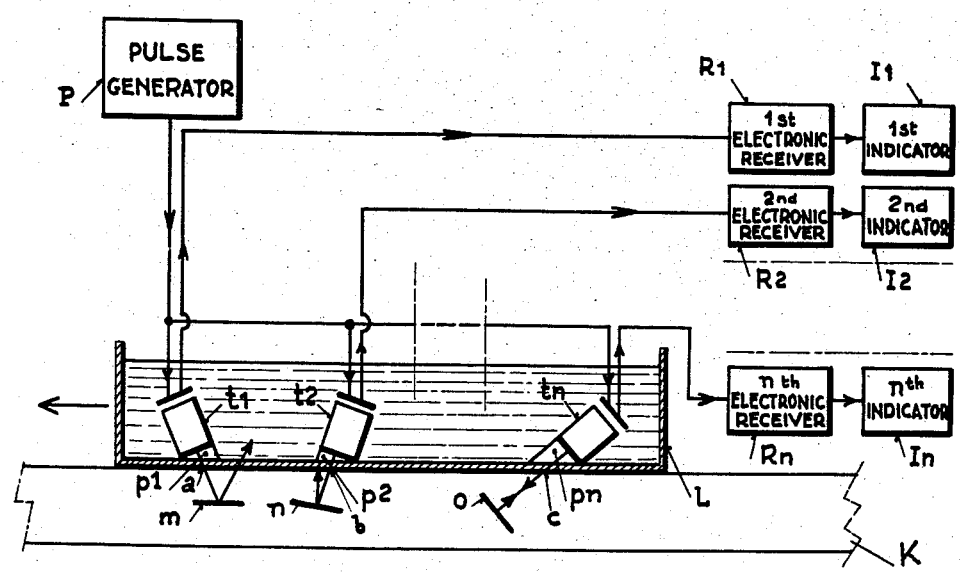
Figure 1 is illustrative of one embodiment of the invention constituting a rail flaw detector device.

Referring now particularly to Fig. 1, P is a pulse generator generating supersonic pulses. Said generator is connected to a plurality of electroacoustic transducers $t_1$, $t_2$ ... $t_n$, transmitting ultrasonic pulses to reflecting surfaces $m$, $n$, $o$ inside the test piece K and receiving reflected vibrations therefrom. $R_1$, $R_2$ ... $R_n$ are electronic receivers having inputs respectively connected to said transducers and comprising amplifying and demodulating units for converting the reflected vibrations into electrical signals of different types at least comprising two of the three above mentioned respective types. $I_1$, $I_2$ ... $I_n$ are indicating means respectively connected to the output of electronic receivers $R_1$ ... $R_n$ adapted to discriminate said types of electrical signals. The transducers are oriented at different angles to, and are immersed in a liquid contained in, a tank L. Prismatic blocks $p_1$, $p_2$, are inserted between inclined bottom faces of the transducers $t_1$, $t_2$, respectively, and the bottom of the tank L, for cooperating in the transmission of pulses into the test piece, and reception of pulses from a reflecting surface therein, in desired directions. It is obvious that, if the container L is moved along the surface of the test piece K, the differently oriented ultrasonic beams transmitted to said piece by the transducers may impinge on internal flaws, and pick up or not the corresponding reflected vibrations according to the orientation of said flaws, as shown in Fig. 1, and illustrated in more detail in the particular examples of Figs. 2a–2i. Thus the relative magnitude of the corresponding different displayed signals and the time relation between the occurrences thereof are an indication of the location and of other characteristics of flaws present in the test member. It will be understood that the term "location" means distance data for the flaw in relation to the actual or temporary position of the transducers on the test member. The other characteristics that are indicated may be the type of the flaw as for instance a hole, a fissure, a porosity, further the orientation or inclination of a fissure within the test piece, and also in many cases the size or length of the flaw considered in the direction of an imaginary line connecting the transducers.

Figure 2:
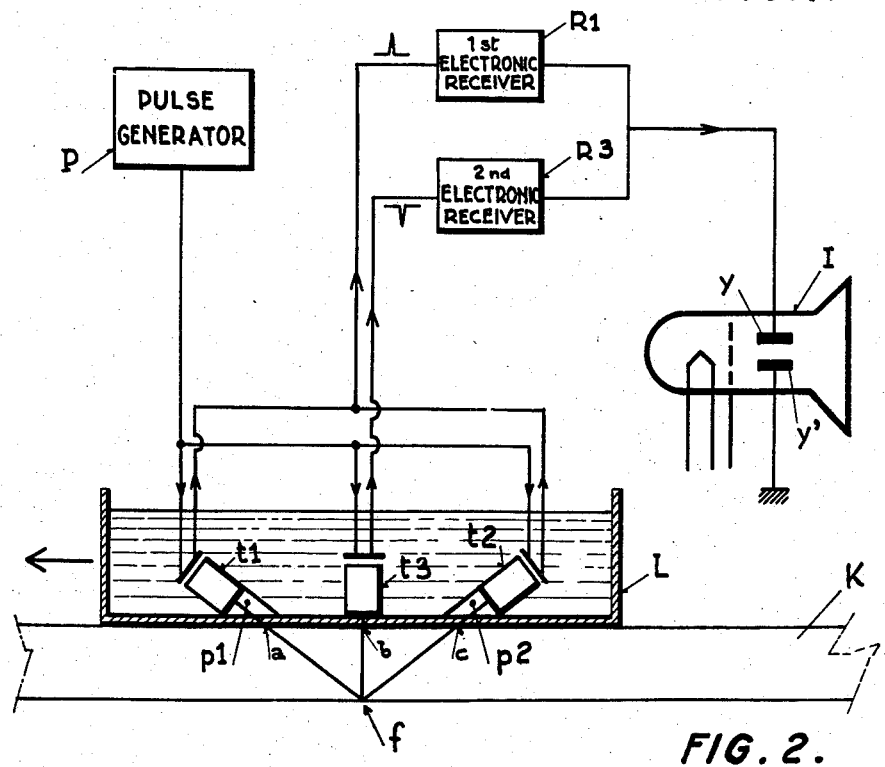
Fig. 2 is a modified example of a supersonic rail flaw detector device according to the invention.

In Fig. 2 in which the same reference symbols relate to the same elements as in Fig. 1, P is a pulse generator, and $t_1$, $t_2$, $t_3$ are three electro-acoustic transducers, which may take the form of piezo-electric elements such as quartz crystals or ceramic elements. The three transducers transmit ultrasonic pulses into the rail K, the paths of said supersonic pulses as illustrated in Figs. 2a–2i and of the echoes reflected on the outer face of the rail being indicated in Fig. 2 as an f, bf, cf, respectively.

According to Fig. 2, the transducers $t_1$ and $t_2$ are said to be "reciprocal," that is: each of said transducers is receiving the back reflections corresponding to the pulses transmitted by the other, whereas $t_3$ is its own reciprocal transducer. Transducers $t_1$, $t_2$ on the one hand, and $t_3$ on the other hand, are respectively connected to electronic receivers, $R_1$ and $R_3$. The outputs of the receivers $R_1$ and $R_3$ are connected to the plates of vertical deflection Y, Y' of cathode ray tube I.

$R_1$ and $R_3$ comprise detecting and amplifying units, in which said pulses are converted into electrical signals of the first two types referred to above: detected positive and negative "pips," respectively, the third type of electrical signal (undetected pulse) not being required for searching defects, in the particular embodiment now being discussed. Said pips are fed to the plates of vertical deflection YY', of a cathode ray tube.

Fig. 2a shows the electrical pips displayed on the screen of the cathode ray tube, when no defect is encountered in the tested rail, the paths of ultrasonic pulses being shown on the right-hand part of the figure. E corresponds to the pulse simultaneously transmitted by the three transducers into the rail, R to the echo received by $t_3$, after transmission along the path bfd; R' corresponds to the echo received by $t_1$, after transmission along the path cfa, and by $t_2$, after transmission along the path afc. The horizontal distances ER and ER', measured along the horizontal trace scan on the screen, are proportional to the distances bf and af, respectively, said distances measured inside the rail.

The apparatus of Fig. 2 is adapted to be moved continuously along the rail, the contact surfaces abc of the three respective transducer arrangements sliding on the surface of the rail (the bottom of the tank L passing the pulses without adverse effect and therefore being disregarded). The mechanical support of the transducer arrangements has not been shown, and various embodiments may be designed without departing from the spirit and scope of this invention.

In Fig. 2b, the transducer $t_1$ is riding near the vertical of the horizontal fissure g, which masks more or less completely the beams ag and cfg, depending upon its size.

Therefore, the echo R' has its amplitude more or less reduced, or even completely disappears, if the defect completely stops said beams, as is the case in the figure.

In Fig. 2c the transducer $t_3$ passes over the horizontal fissure g, which masks more or less completely the beam bfg, and therefore, reduces the amplitude of the echo R. An echo r is appearing, corresponding to the beam bgb.

In Fig. 2d, the transducer $t_1$ is riding near an inclined fissure reflecting back to said transducer an echo r'. Again echo R' is suppressed by the interruption of beam cfg. The operation of the apparatus in Fig. 2e will be understood without further description.

In Fig. 2f, $t_2$ is riding near a slightly inclined fissure g, nearly horizontal, and there is no echo r' in this case. Moreover the defect g partially masks the beam afc, whereby only a small echo R' is appearing.

In Figs. 2g and 2h the defect T is a splinter hole, and the operation of the apparatus will be understood without further description.

In Fig. 2i, N is a bundle of porosities, which successively masks the echoes R' and R, without giving any echo of the r or r' types.

It may be seen, from the above description, that the operator may easily identify the type of defect encountered in the rail and approximately determine its orientation and its location by a mere glance at the screen of the cathode ray tube, each type of defect being characterized by a specific configuration of the displayed signals, or by specific changes in said configuration when the transducers are slid on the surface of the rail. The number of possible configurations of the displayed signals is much greater than the number of distinct electrical signals which can be distinguished by the electronic units $R_1$ and $R_3$. For instance, in the above-described embodiment, this last number is equal to two.

In Figs. 2a–2i six different configurations of the displayed signals are illustrated. As can be seen at least five different types of flaws in the test member can be ascertained by the operator by these illustrations.

Figure 3:
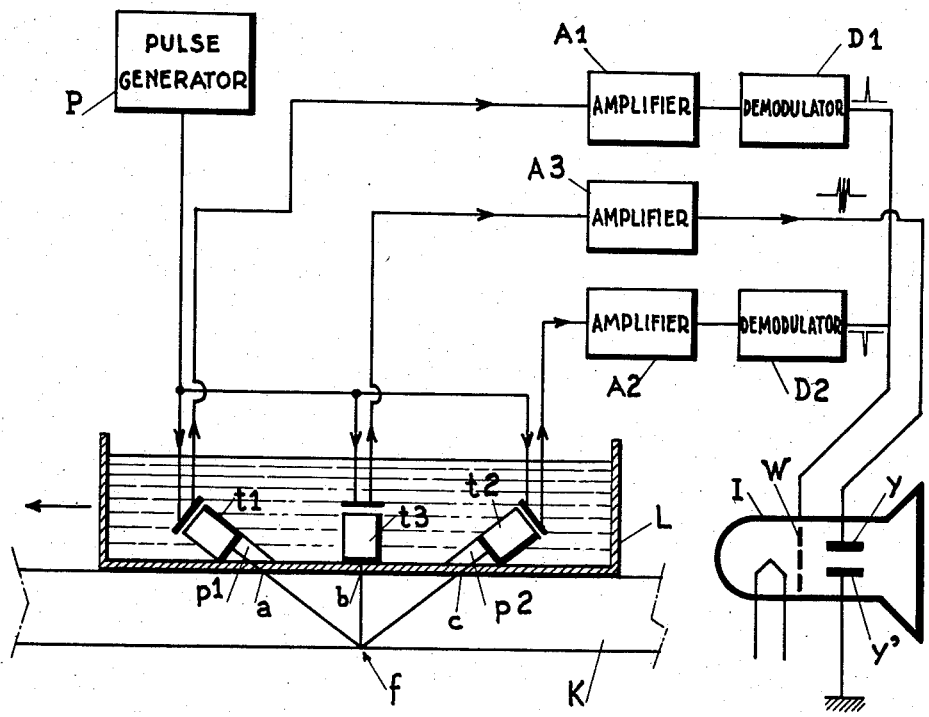
Fig. 3 shows a modified embodiment, in which there is used three types of impulses.

In Fig. 3, the arrangement of the pulse generator P and the three transducers $t_1$, $t_2$, $t_3$ is the same as in Fig. 2 but the electronic receivers comprise three amplifiers $A_1$, $A_2$, $A_3$ respectively connected at the output of the transducers $t_1$, $t_2$, $t_3$. The output of amplifier $A_3$ is directly connected to the plates of vertical deflection YY' of cathode ray tube I, whereas amplifiers $A_1$ and $A_2$ are connected to the control electrode W of the cathode ray tube, through demodulators $D_1$ and $D_2$, respectively. As shown, the output of demodulators $D_1$ and $D_2$ are positive and negative "pips," respectively, whereas the output of amplifier $A_2$ consists of undemodulated impulses.

In this arrangement, it is obvious that the undemodulated pulses are displayed in the usual way on the screen of the cathode ray tube through vertical deflection of its electron beam, whereas the positive and negative pips, when present, control the brightness of the horizontal trace scan on the screen: said brightness has a medium value, as determined by properly biasing the control electrode W, in the absence of the pips; the positive pips, for instance, produce a brighter spot, and the negative pips a darker spot on said horizontal trace scan. Obviously, in the embodiment of Fig. 3, the number of possible configurations of the displayed signals is larger than in Fig. 2, this advantage being obtained with the same number of transducers, but through the addition of new electronic units.

Although the present invention has been discussed above in relation to ultrasonic detector units for testing metal objects, it will be understood that it is not meant to be limited to this particular application, and moreover it will be appreciated that modifications may be made therein by those skilled in the art, without departing from the spirit and scope of the invention, as set forth in the appended claims.

What I claim is:

1. In an apparatus for the non-destructive flaw detection of test bodies having a front and a back surface, in combination, at least one pair of ultrasonic generating and pick-up members each having an input and an output and being adapted to be mounted adjacent said front surface of the test body; energizing means connected to said input of said ultrasonic generating and pick-up members, respectively, for energizing the same and to cause the same to generate directional ultrasonic impulses and transmit said impulses from each one of said generating and pick-up members along a predetermined path, respectively, through at least a portion of the test body, in such a manner that said impulses transmitted from one of said members are reflected from an inside portion of said back surface of the test body into the other one of said generating and pick-up members and are reflected away from said other member by flaws that may be located within said test body along said predetermined path; detector means connected to said output of said generating and pick-up members, respectively, for detecting said reflected impulses and for generating at least two different types of signals corresponding respectively to said reflected impulses generated by said two ultrasonic generating and pick-up members; and means connected to said detector means for indicating at least said two different types of signals, the relative magnitude of said signals and the time relation of occurrences thereof being an indication of the location and other characteristics of flaws present in the test body.

2. In an apparatus for the non-destructive flaw detection of test bodies having a front and a back surface, in combination, at least one pair of ultrasonic generating and pick-up members each having an input and an output and being adapted to be mounted adjacent said front surface of the test body, said test member, on one hand, and said pair of generating and pick-up members, on the other hand, being movable relatively to each other; energizing means connected to said input of said ultrasonic generating and pick-up members, respectively, for energizing the same and to cause the same to generate directional ultrasonic impulses and transmit said impulses from each one of said generating and pick-up members along a predetermined path, respectively, through at least a portion of the test body, in such a manner that said impulses transmitted from one of said members are reflected from an inside portion of said back surface of the test body into the other one of said generating and pick-up members and are reflected away from said other member by flaws that may be located within said test body along said predetermined path; detector means connected to said output of said generating and pick-up members, respectively, for detecting said reflected impulses and for generating at least two different types of signals corresponding respectively to said reflected impulses generated by said two ultrasonic generating and pick-up members; and cathode ray tube means connected to said detector means and having a time axis for visually displaying at least said two different types of signals, the relative magnitude of said signals and the time relation of occurrences thereof being an indication of the location and other characteristics of flaws present in the test body.

3. In an apparatus for the non-destructive flaw detection of test bodies having a front and a back surface, in combination, at least one pair of ultrasonic generating and pick-up members each having an input and an output and being adapted to be mounted adjacent said front surface of the test body, said test member, on one hand, and said pair of generating and pick-up members, on the other hand, being movable relatively to each other; energizing means connected to said input of said ultrasonic generating and pick-up members, respectively, for energizing the same and to cause the same to generate directional ultrasonic impulses and transmit said impulses from each one of said generating and pick-up members along a predetermined path, respectively, through at least a portion of the test body, in such a manner that said impulses transmitted from one of said members are reflected from an inside portion of said back surface of the test body into the other one of said generating and pick-up members and are reflected away from said other member by flaws that may be located within said test body along said predetermined path; first detecting means connected to the output of one of said generating and pick-up members for detecting said reflected impulses corresponding to the impulses transmitted from the other one of said generating and pick-up members and for producing at least one positive signal for each of said reflected pulses; second detecting means connected to the output of the other one of said generating and pick-up members for detecting said reflected impulses corresponding to the impulses transmitted from said one of said generating and pick-up members and for producing at least one negative signal for each of said last mentioned reflected impulses; and means connected to said detecting means for indicating said positive and negative signals, the relative magnitude of said signals and the time relation of occurrences thereof being an indication of the location and other characteristics of flaws present in the test body.

4. In an apparatus for the non-destructive flaw detection of test bodies having a front and a back surface, in combination, at least one pair of ultrasonic generating and pick-up members each having an input and an output and being adapted to be mounted adjacent said front surface of the test body, said test body, on one hand, and said pair of generating and pick-up members, on the other hand, being movable relatively to each other; energizing means connected to said input of said ultrasonic generating and pick-up members, respectively, for energizing the same and to cause the same to generate directional ultrasonic impulses and transmit said impulses from each one of said generating and pick-up members along a predetermined path, respectively, through at least a portion of the test body, in such a manner that said impulses transmitted from one of said members are reflected from an inside portion of said back surface of the test body into the other one of said generating and pick-up members and are reflected away from said other member by flaws that may be located within said test body along said predetermined path; first detecting means connected to the output of one of said generating and pick-up members for detecting said reflected impulses corresponding to the impulses transmitted from the other one of said generating and pick-up members and for producing at least one positive signal for each of said reflected impulses; second detecting means connected to the output of the other one of said generating and pick-up members for detecting said reflected impulses corresponding to the impulses transmitted from said one of said generating and pick-up members and for producing at least one negative signal for each of said last mentioned reflected impulses; and cathode ray tube means connected to said detecting means and having a time axis for visually displaying said positive and negative signals, the relative magnitude of said signals and the time relation of occurrences thereof being an indication of the location and other characteristics of flaws present in the test body.

5. An apparatus for the non-destructive flaw detection of test bodies having a front and a back surface, comprising, in combination, a group of transducers including at least a first, a second, and a third ultrasonic transducer each having an input and an output and being mounted adjacent said front surface of the test body, said test body and said group of transducers being movable relatively to each other; energizing means connected to said input of each of said ultrasonic transducers for simultaneously energizing the same and to cause the same to generate directional ultrasonic impulses and transmit said impulses from each one of said transducers along a predetermined path, respectively, through at least a portion of the test body in such a manner that said impulses respectively transmitted by said transducers are reflected from an inside portion of said back surface of the test body into a predetermined one of said transducers, respectively, and are deflected by any flaws that may be located within said test body along said predetermined path, said first and second transducers being constructed and arranged with respect to each other and said inside portion of said back surface in such a manner that the impulses transmitted from said first transducer and reflected from said inside portion of said back surface of the test body impinge on said second transducer, and vice-versa, said third transducer being arranged with respect to said portion of said back surface in such manner that the impulses transmitted thereby and reflected from said inside portion of said back surface impinge on said third transducer, the transducer upon which reflected impulses impinge thereby generating electrical impulses corresponding to said reflected impulses; receiving means connected to said outputs of said transducers, respectively, and responsive to said generated electrical impulses for respectively producing at least two different types of signals corresponding respectively to the reflected impulses received by at least two of said three transducers; and means connected to said receiving means for indicating at least said two different types of signals, the relative magnitude of said signals and the time relation of occurrences thereof being an indication of the location and other characteristics of flaws present in the test body.

6. An apparatus for the non-destructive flaw detection of test bodies having a front and a back surface, comprising, in combination, a group of transducers including at least a first, a second, and a third ultrasonic transducer each having an input and an output and being mounted adjacent said front surface of the test body, said test body and said group of transducers being movable relatively to each other; energizing means connected to said input of each of said ultrasonic transducers for simultaneously energizing the same and to cause the same to generate directional ultrasonic impulses and transmit said impulses from each one of said transducers along a predetermined path, respectively, through at least a portion of the test body in such a manner that said impulses respectively transmitted by said transducers are reflected from an inside portion of said back surface of the test body into a predetermined one of said transducers, respectively, and are deflected by any flaws that may be located within said test body along said predetermined path, said first and second transducers being constructed and arranged with respect to each other and said inside portion of said back surface in such a manner that the impulses transmitted from said first transducer and reflected from said inside portion of said back surface of the test body impinge on said second transducer, and vice-versa, said third transducer being arranged with respect to said portion of said back surface in such manner that the impulses transmitted thereby and reflected from said inside portion of said back surface impinge on said third transducer, the transducers upon which reflected impulses impinge thereby generating electrical impulses corresponding to said reflected impulses; receiving means connected to the outputs of said transducers, respectively, and responsive to said generated electrical impulses for respectively producing at least two different types of signals corresponding respectively to the reflected impulses received by at least two of said three transducers; and a cathode ray tube connected to said receiving means and having a time axis connected to said receiving means for visually indicating at least said two different types of signals, the relative magnitude of said signals and the time relation of occurrences thereof being an indication of the location and other characteristics of flaws present in the test body.

References Cited in the file of this patent

UNITED STATES PATENTS

| | | |
|---|---|---|
| 2,667,780 | Van Valkenburg | Feb. 2, 1954 |

FOREIGN PATENTS

| | | |
|---|---|---|
| 889,840 | Germany | Sept. 14, 1953 |
| 718,291 | Great Britain | Nov. 10, 1954 |